United States Patent [19]
Kuhlenschmidt

[11] Patent Number: 5,911,746
[45] Date of Patent: Jun. 15, 1999

[54] GAX ABSORPTION CYCLE WITH SECONDARY REFRIGERANT

[75] Inventor: Donald Kuhlenschmidt, Evansville, Ind.

[73] Assignee: Gas Research Institute, Chicago, Ill.

[21] Appl. No.: 08/998,360

[22] Filed: Dec. 24, 1997

[51] Int. Cl.[6] .................................................. F25B 15/00
[52] U.S. Cl. ................................ 62/102; 62/112; 62/476; 62/494
[58] Field of Search ............................ 62/101, 112, 102, 62/476, 494, 490, 493

[56] References Cited

U.S. PATENT DOCUMENTS

| | | | |
|---|---|---|---|
| 3,527,060 | 9/1970 | Kruggel | 62/140 |
| 3,641,784 | 2/1972 | Schlichtig | 62/476 |
| 3,742,728 | 7/1973 | Mamiya | 62/476 |
| 3,977,204 | 8/1976 | Bourne | 62/101 |
| 4,100,755 | 7/1978 | Leonard | 62/2 |
| 4,413,479 | 11/1983 | Rojey | 62/101 |
| 4,593,538 | 6/1986 | Borde et al. | 62/490 |
| 5,016,444 | 5/1991 | Erickson | 62/79 |
| 5,024,063 | 6/1991 | Erickson | 62/101 |
| 5,271,235 | 12/1993 | Phillips et al. | 62/101 |
| 5,284,029 | 2/1994 | Keuper et al. | 62/476 |
| 5,295,371 | 3/1994 | Oonou et al. | 62/476 |
| 5,333,471 | 8/1994 | Yamada | 62/476 |
| 5,359,864 | 11/1994 | Yamada | 62/480 |
| 5,467,614 | 11/1995 | DeVault | 62/476 |
| 5,689,971 | 11/1997 | Kuhlenschmidt et al. | 62/484 |

*Primary Examiner*—William Doerrler
*Attorney, Agent, or Firm*—Pauley Petersen Kinne & Fejer

[57] ABSTRACT

A modified Generator-Absorber-Heat Exchanger (GAX) absorption cycle system and method of operation are provided wherein, in addition to a primary refrigerant circulated through a first refrigerant circuit, a secondary refrigerant is circulated through a second refrigerant circuit to improve the coefficient of performance (COP) of the cycle.

24 Claims, 1 Drawing Sheet

GAX ABSORPTION CYCLE WITH SECONDARY REFRIGERANT

CROSS REFERENCE TO RELATED APPLICATIONS

The subject matter of this application is related to prior application U.S. Ser. No. 08/584,189, filed Jan. 11, 1996, now Kuhlenschmidt et al., U.S. Pat. No. 5,689,971, issued Nov. 25, 1997 and corresponding parent application U.S. Ser. No. 08/532,241, filed Sept. 22, 1995, now U.S. Pat. No. 5,729,999 issued Mar. 24, 1998 which prior applications have Donald Kuhlenschmidt as an inventor in common with this application. These related applications are hereby incorporated by reference herein and made a part hereof, including but not limited to those portions which specifically appear hereinafter.

BACKGROUND OF THE INVENTION

This invention relates generally to cooling and heating refrigeration systems and, more particularly, to a GAX absorption cycle with a secondary refrigerant.

Absorption cooling and heating systems are well known. In such a system operated in a cooling mode, a generator heats a refrigerant solution comprising a "strong" or concentrated solution of a more-volatile or refrigerant component in a less-volatile or solvent component. The heat drives the refrigerant from the strong solution to separate a refrigerant vapor, leaving a "weak solution" that is depleted of the refrigerant.

Where the refrigerant solution is a solution of a nonvolatile solute in a volatile solvent, such as lithium bromide in water, the "weak solution" contains a higher concentration of the solute but a lower concentration of the solvent than the corresponding "strong solution." Where the refrigerant solution is a solution of a more volatile solute in a less-volatile solvent, such as ammonia in water, the "weak solution" is depleted of ammonia and is mostly water, while the "strong solution" is a more concentrated ammonia solution.

After being separated in the generator, the refrigerant vapor leaves the generator, flowing to a first phase change heat exchange device operated as a condenser. In the condenser the refrigerant vapor is placed under pressure and heat is removed to an external heat sink. As a result, the vapor condenses to form a refrigerant liquid. After leaving the condenser, the refrigerant liquid flows to a second phase change heat exchange device operated as an evaporator. The evaporator relieves the pressure on the refrigerant liquid and the refrigerant evaporates, again forming a vapor. This evaporation of the refrigerant draws heat from a heat load and creates the cooling effect of a refrigerator or air conditioner.

The refrigerant vapor from the evaporator flows to an absorber. The weak solution formed in the generator also flows to the absorber. In the absorber, the weak solution reabsorbs the refrigerant, reforming the strong solution. The strong solution then flows back to the generator and the cycle repeats.

The same system can be operated in a heating mode by reversing operation of the first and second phase change heat exchange devices such that the first phase change heat exchange device now operates as an evaporator and the second phase change heat exchange device operates as a condenser, with the associated heat inputs and outputs correspondingly also being reversed.

One refinement of such an absorption system is the incorporation of a device that functions as a generator to drive vapor from solution, as an absorber to absorb vapor into solution and as a heat exchanger to exchange heat between fluids. Such a device is sometimes referred to as a "GAX" device (e.g., generator-absorber-heat exchanger).

While the proper incorporation and use of a GAX device can improve cycle efficiency and performance, it has been desired to further increase the coefficient of performance (COP) of such a GAX cycle to thus make such a cycle more competitive with common vapor compression refrigerant technology as an attractive commercial heating and cooling technology.

SUMMARY OF THE INVENTION

A general object of the invention is to provide an improved GAX absorption cycle.

A more specific objective of the invention is to overcome one or more of the problems described above.

The general object of the invention can be attained, at least in part, though an absorption cycle system which includes first and second refrigerant circuits. More specifically, in accordance with one embodiment of the invention, the first refrigerant circuit includes a generator, a first condenser, an evaporator, an absorber and a GAX device that simultaneously operates as a generator, an absorber and a heat exchanger wherein a first refrigerant and an absorbent therefor are circulated. The second refrigerant circuit includes a second refrigerant condenser whereby a second refrigerant which is inert to the first refrigerant and the absorbent is circulated to at least one of the absorber and GAX device.

The prior art fails to provide a GAX absorption cycle having as high as desired a coefficient of performance (COP).

The invention further comprehends, in accordance with an alternative embodiment of the invention, an absorption cycle system which includes a first generator which is heated by an external source of heat to heat a refrigerant solution which includes a solute in a solvent to form a first refrigerant vapor and a weak solution. The system also includes a first condenser which condenses at least a portion of the first refrigerant vapor to form a first refrigerant liquid. The system further includes an evaporator having evaporator operating conditions including temperature and pressure whereby at least a portion of the first refrigerant liquid evaporates to reform a first refrigerant vapor. The system still further includes a first absorber wherein at least a portion of the reformed first refrigerant vapor is absorbed by weak solution initially formed in the first generator to form a first strong solution. The system yet still further includes a GAX assembly forming a second absorber, a heat exchanger and a second generator; wherein in the second absorber at least a portion of the reformed first refrigerant vapor remaining unabsorbed after passage though the first absorber is absorbed by weak solution from the first generator, wherein in the heat exchanger the first strong solution circulates in heat exchange relationship with the weak solution from the first generator to preheat the first strong solution prior to passage into the first generator; and wherein in the second generator at least a portion of the strong solution is heated to reform vapor. Additionally, the system includes a second refrigerant circuit including a second refrigerant condenser whereby a second refrigerant is circulated to at least one of the first absorber and the GAX assembly. The second refrigerant is selected to be inert to the solute and the solvent; condense at conditions of atmospheric temperature and the operating pressure of the absorber; and evaporate at the operating conditions of the evaporator.

The invention still further comprehends an improvement in the operation of an absorption cycle system wherein a first refrigerant and an absorbent for the first refrigerant are circulated in a first refrigerant circuit which includes a generator, a first condenser, an evaporator, an absorber and a GAX device. The improvement involves the circulation of a second refrigerant to at least one of the absorber and the GAX device though a second refrigerant circuit including a second refrigerant condenser. The second refrigerant is selected to be inert to the first refrigerant and the absorbent for the first refrigerant.

Other objects and advantages will be apparent to those skilled in the art from the following detailed description taken in conjunction with the appended claims and drawing.

DETAILED DESCRIPTION OF THE INVENTION

Figure 1:
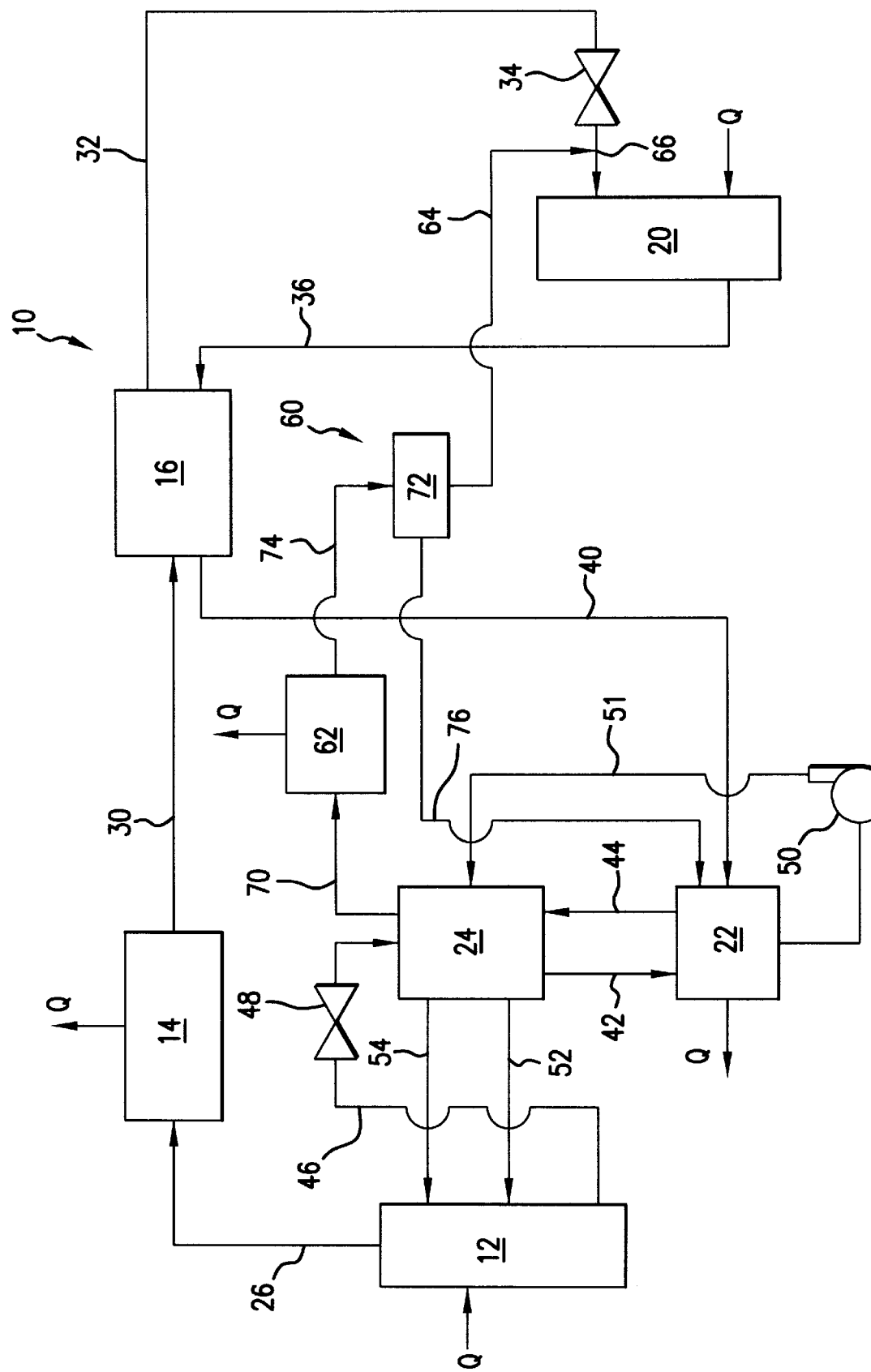
FIG. 1 is a schematic flow diagram of a Generator-Absorber-Heat Exchanger (GAX) absorption cycle system, in accordance with one embodiment of the invention.

FIG. 1 illustrates a modified Generator-Absorber-Heat Exchanger (GAX) system, generally designated by the reference numeral 10, in accordance with one embodiment of the invention. The GAX system 10 includes a generator 12, a condenser 14, a heat exchanger 16, an evaporator 20, an absorber 22, and a GAX device 24 that simultaneously operates as a generator, an absorber and a heat exchanger.

When it enters the generator 12, the strong refrigerant solution generally has its maximum concentration of dissolved refrigerant vapor. The refrigerant solution is heated in the generator 12, as represented by the letter Q and the arrow indicating the direction of heat transfer. The heat distills the refrigerant from the solution to form a free refrigerant vapor and deplete the remaining liquid of refrigerant. The remaining liquid is now a "weak solution." The refrigerant vapor leaves the generator 12 via a conduit 26 and flows to the condenser 14.

In the condenser 14, the refrigerant vapor is maintained under pressure and allowed to cool. As a result, the refrigerant vapor condenses to become a liquid. The heat of condensation Q is removed to a heat sink, which can be anything capable of absorbing heat.

The relatively hot liquid refrigerant under pressure then flows via a conduit 30 from the condenser 14 to the refrigerant heat exchanger 16 and passed in heat exchange relation with refrigerant vapor from the evaporator 20, thus cooling the liquid refrigerant and heating the refrigerant vapor.

The liquid refrigerant then flows via a conduit 32 to the evaporator 20. As the liquid refrigerant flows to the evaporator 20, a first expansion valve 34 relieves the pressure on the refrigerant. The refrigerant evaporates in the evaporator 20, absorbing heat Q into the system from a heat load to produce the cooling effect of the cooling mode operation of the present system.

Refrigerant vapor flows from the evaporator 20 via a conduit 36 to the refrigerant heat exchanger 16. As described above, in the heat exchanger 16, the hot liquid refrigerant from the condenser 14 transfers heat to the refrigerant vapor from the evaporator 20.

The absorber 22 receives vapor from the heat exchanger 16 via a conduit 40 and solution via a first passage 42. The absorber 22 circulates the solution and vapor, such as in a known manner, to at least partially absorb the vapor in the solution. Also, the absorber 22 circulates a coolant in heat exchange relationship with the solution and the vapor (removing heat Q from the absorber) to facilitate absorption of the vapor into the solution. The absorber 22 releases excess vapor to the GAX device 24 via a second passage 44. Alternatively, the first passage 42 and the second passage 44 may be the same passage.

After the generator 12 drives the refrigerant from the strong solution, the remaining solution is a weak solution. The weak solution is hot, having been heated to evaporate and separate the refrigerant vapor. The hot, weak solution flows from the generator 12 via a conduit 46 though a second expansion valve 48 to the GAX device 24.

The GAX device 24 operates as a second absorber such as by circulating the hot, weak solution downward and the vapor received from the absorber 22 upward to absorb the vapor in the solution.

The GAX device 24 also operates as a heat exchanger. The strong solution from the absorber 22 is pumped by the strong solution pump 50 via a conduit 51 to the GAX device 24. The GAX device 24 circulates the cooler, strong solution in heat exchange relationship with the hotter, weak solution from the generator 12. The weak solution transfers heat to the strong solution to preheat the strong solution before it reaches the generator 12. Moreover, by the strong solution absorbing the heat of absorption in the GAX device 24, absorption of vapor into the weak solution is facilitated. Some of the strong solution then flows to the generator 12 via the first generator conduit 52.

Finally, the GAX device 24 also operates as a generator. The strong solution remaining in GAX device 24 continues to circulate in heat exchange relationship with the hot, weak solution, causing the strong solution to become superheated. As it becomes superheated, the strong solution releases at least some vapor. The strong solution and vapor mixture then flows to the generator 12 via a second generator conduit 54. Because the strong solution has already been superheated to release at least some vapor, the load on the generator 12 is lightened and the temperature differential between the weak and strong solution may advantageously be utilized.

The system 10, in accordance with the invention, additionally includes a secondary refrigerant circuit, generally designated by the reference numeral 60. The secondary refrigerant circuit includes a secondary refrigerant condenser 62 and allows a selected secondary refrigerant to be added and processed as a part of the system 10 so as increase the coefficient of performance (COP) of the system by increasing the cooling obtained through the system.

The secondary refrigerant, as further described below, is preferably selected to condense at conditions of at or near atmospheric temperature and the pressure of the absorber; evaporate at conditions of at or near evaporator temperature and pressure; and be inert to the primary refrigerant and the selected primary refrigerant solvent.

More specifically, the secondary refrigerant is preferably added or introduced, such as via a conduit 64, to the stream of the primary refrigerant flowing to the evaporator 20 at a point 66 downstream of the expansion valve 34. As identified above, the secondary refrigerant is preferably inert to the primary refrigerant (e.g., ammonia) and the selected primary refrigerant solvent (e.g., water). As a result, the primary refrigerant can act and serve as a carrier for the secondary refrigerant in the system 10.

As the partial pressure of the secondary refrigerant at the addition point 66 is at or near zero, the secondary refrigerant will diffuse or evaporate into the carrier stream 32. The secondary refrigerant carried with the carrier gas continues to diffuse into the carrier gas as both the primary and secondary refrigerants flow through the evaporator 20 and to the absorber 22, such as via the conduits 36 and 40.

As identified above, the secondary refrigerant is preferably inert to the primary refrigerant and the selected primary refrigerant solvent (which acts or serves as an absorbent for the primary refrigerant). Consequently, the secondary refrigerant will pass through the absorber 22 and to the GAX device 24, such as via the passage 44.

Similarly, the secondary refrigerant will pass through the GAX device 24 as such secondary refrigerant is preferably inert to the primary refrigerant and the primary refrigerant solvent. It will be appreciated that after the passage of the strong solution and the strong solution with vapor from the GAX device 24 to the generator 12 via the conduits 52 and 54, respectively, very little residual primary refrigerant typically remains at the top of the GAX device 24.

A conduit 70 joins the top of the GAX device 24 to the secondary condenser 62. In the secondary condenser 62, the secondary refrigerant vapor is maintained under pressure and allowed to cool, such as in a known manner such through the use of air or water as a coolant. As a result, the secondary refrigerant vapor condenses to become a liquid. The heat of condensation Q is removed to a heat sink, which can be anything capable of absorbing heat.

The secondary condenser 62 is joined to a secondary refrigerant receiver 72 via a conduit 74. The receiver 72 receives the secondary refrigerant liquid from the condenser 62. Also, passed via the conduit 74 to the receiver 72 is any residual primary refrigerant vapor remaining in the process stream. Any such residual remaining primary refrigerant vapor is vented back to the absorber 22 via a conduit 76.

The secondary refrigerant is passed via the conduit 64 from the receiver vessel 72 to the introduction point 66 to repeat the process, as desired. It will be appreciated that via such a secondary refrigerant circuit, the secondary refrigerant added to the primary refrigerant circuit is formed without imposing any significant energy demands or requirements on the system and can thus serve so as to increase the coefficient of performance (COP) of the system.

For an ammonia-water-based absorption cycle, normal butane can be selected and used as a secondary refrigerant in accordance with the invention. It is to be appreciated, however, that various secondary refrigerants can be selected for use in accordance with the above-identified criteria, i.e., preferably selected to condense at conditions of at or near atmospheric temperature and the pressure of the absorber; to evaporate at conditions of at or near evaporator temperature and pressure; and be inert to the primary refrigerant and the selected primary refrigerant solvent.

Moreover, while the invention has been described above in relation to a system having a separate absorber 22 and GAX device 24, those skilled in the art will appreciate that such an absorber and GAX device can, if desired, be combined in as a single unit such as may facilitate space conservation and help promote or encourage effective vapor and solution flow. Such a combination of an absorber and a GAX device is described in great detail in the above-identified and herein incorporated prior application U.S. Ser. No. 08/584,189, filed Jan. 11, 1996, now Kuhlenschmidt et al., U.S. Pat. No. 5,689,971.

Further, it will be appreciated that while the invention has been described above with reference to the addition and subsequent passage of the secondary refrigerant to the absorber of the system, as the GAX device typically functions, at least in part as an absorber, in an alternative embodiment of the invention the secondary refrigerant can alternatively or in addition be passed to the GAX device itself without prior passage through such a separate absorber device. It will be appreciated, however, that with such direct passage of the secondary refrigerant to the GAX device some of the potential energy efficiency gains obtainable through the invention may not be completely or fully realized.

Still further, while the invention has been described above in relation to a GAX system normally operating in a cooling mode, those skilled in the art will readily appreciate that the invention can also be applied, if desired, to a GAX system operating in a heating mode.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An absorption cycle system comprising:
   a first refrigerant circuit including a generator, a first condenser, an evaporator, an absorber and a GAX device that simultaneously operates as a generator, an absorber and a heat exchanger wherein a first refrigerant and an absorbent therefor are circulated and
   a second refrigerant circuit whereby a second refrigerant vapor is circulated, in direct contact with the first refrigerant, to at least one of the absorber and GAX device, the second refrigerant being inert to the first refrigerant and the absorbent for the first refrigerant, the second refrigerant circuit including a second refrigerant condenser wherein the second refrigerant vapor is condensed subsequent to circulation to the at least one of the absorber and GAX device.

2. The system of claim 1 wherein the second refrigerant is circulated to at least the absorber.

3. The system of claim 1 wherein the second refrigerant is circulated to at least the GAX device.

4. The system of claim 3 wherein the second refrigerant is additionally circulated to the absorber.

5. The system of claim 1 wherein the second refrigerant is selected to condense at conditions of about atmospheric temperature and the operating pressure of the absorber.

6. The system of claim 1 wherein the second refrigerant is selected to evaporate at conditions of about the operating temperature and pressure of the evaporator.

7. The system of claim 6 wherein the second refrigerant is additionally selected to condense at conditions of about atmospheric temperature and the operating pressure of the absorber.

8. The system of claim 1 wherein the first refrigerant comprises ammonia.

9. The system of claim 1 wherein the second refrigerant comprises normal butane.

10. An absorption cycle system comprising:
- a first generator which is heated by an external source of heat to heat a refrigerant solution which includes a solute in a solvent to form a first refrigerant vapor and a weak solution;
- a first condenser which condenses at least a portion of the first refrigerant vapor to form a first refrigerant liquid;
- an evaporator having evaporator operating conditions including temperature and pressure whereby at least a portion of the first refrigerant liquid evaporates to reform a first refrigerant vapor;
- a first absorber wherein at least a portion of the reformed first refrigerant vapor is absorbed by weak solution initially formed in said first generator to form a first strong solution;
- a GAX assembly forming a second absorber, a heat exchanger and a second generator; wherein in the second absorber at least a portion of the reformed first refrigerant vapor remaining unabsorbed after passage through the first absorber is absorbed by weak solution from the first generator, wherein in the heat exchanger the first strong solution circulates in heat exchange relationship with the weak solution from the first generator to preheat the first strong solution prior to passage into the first generator; and wherein in the second generator at least a portion of the strong solution is heated to reform vapor; and
- a second refrigerant circuit whereby a second refrigerant vapor is circulated, in direct contact with the first refrigerant, to at least one of the first absorber and GAX assembly, the second refrigerant being inert to the solute and the solvent, with the second refrigerant condensing at conditions of atmospheric temperature and the operating pressure of the absorber and evaporating at the operating conditions of the evaporator, the second refrigerant circuit including a second refrigerant condenser wherein the second refrigerant vapor is condensed subsequent to circulation to the at least one of the first absorber and GAX assembly.

11. The system of claim 10 wherein the second refrigerant is circulated to at least the absorber.

12. The system of claim 10 wherein the second refrigerant is circulated to at least the GAX device.

13. The system of claim 12 wherein the second refrigerant is additionally circulated to the absorber.

14. The system of claim 10 wherein the solute comprises ammonia.

15. The system of claim 14 wherein the solvent comprises water and the second refrigerant comprises normal butane.

16. The system of claim 10 wherein the second refrigerant comprises normal butane.

17. In the method of operation of an absorption cycle system wherein a first refrigerant and an absorbent for the first refrigerant are circulated in a first refrigerant circuit which includes a generator, a first condenser, an evaporator, an absorber and a GAX device, the improvement comprising:
- passing a second refrigerant vapor, in direct contact with the first refrigerant to at least one of the absorber and GAX device, the second refrigerant being inert to the first refrigerant and the absorbent for the first refrigerant and
- subsequently, condensing the second refrigerant vapor in a second refrigerant condenser.

18. The method of claim 17 wherein the second refrigerant is passed to at least the absorber.

19. The method of claim 17 wherein the second refrigerant is passed to at least the GAX device.

20. The method of claim 19 wherein the second refrigerant is additionally passed to the absorber.

21. The method of claim 17 wherein the second refrigerant is selected to condense at conditions of about atmospheric temperature and the operating pressure of the absorber.

22. The method of claim 17 wherein the second refrigerant is selected to evaporate at the operating temperature and pressure of the evaporator.

23. The method of claim 22 wherein the second refrigerant is additionally selected to condense at conditions of about atmospheric temperature and the operating pressure of the absorber.

24. The method of claim 17 wherein with said condensing step, a residual quantity of the first refrigerant is separated from the secondary refrigerant.

* * * * *